Sept. 21, 1943.  G. M. MAGRUM  2,329,923
HYDRAULIC SHOCK ABSORBER
Filed July 23, 1942  5 Sheets-Sheet 1

Inventor
GERVASE M. MAGRUM.
by Charles... Atty

Sept. 21, 1943.  G. M. MAGRUM  2,329,923
HYDRAULIC SHOCK ABSORBER
Filed July 23, 1942    5 Sheets-Sheet 2

Inventor
GERVASE M. MAGRUM.

Sept. 21, 1943.  G. M. MAGRUM  2,329,923
HYDRAULIC SHOCK ABSORBER
Filed July 23, 1942  5 Sheets-Sheet 3
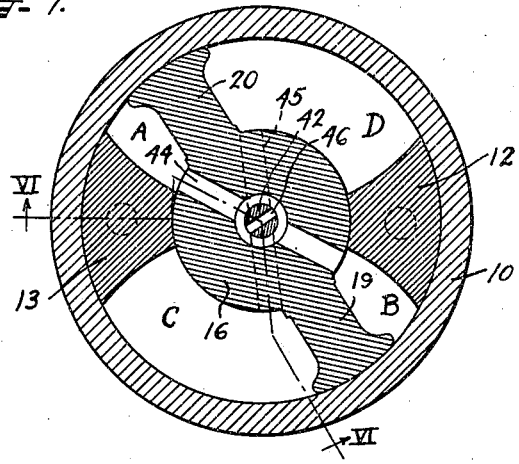
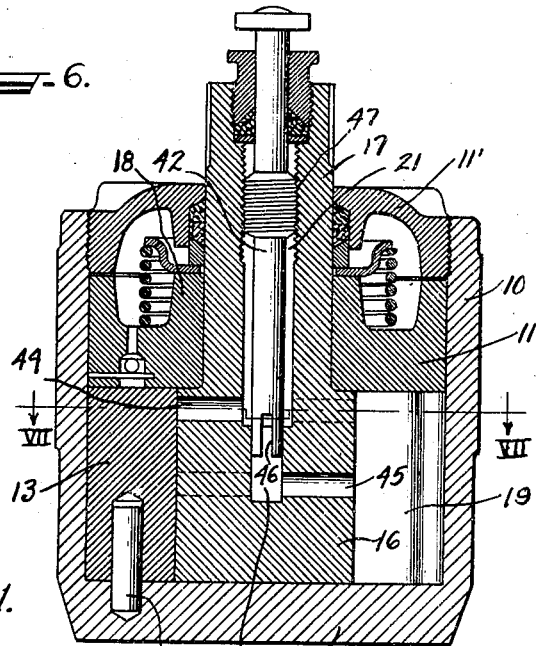
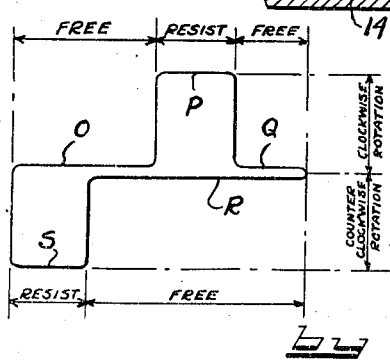
Inventor
GERVASE M. MAGRUM.

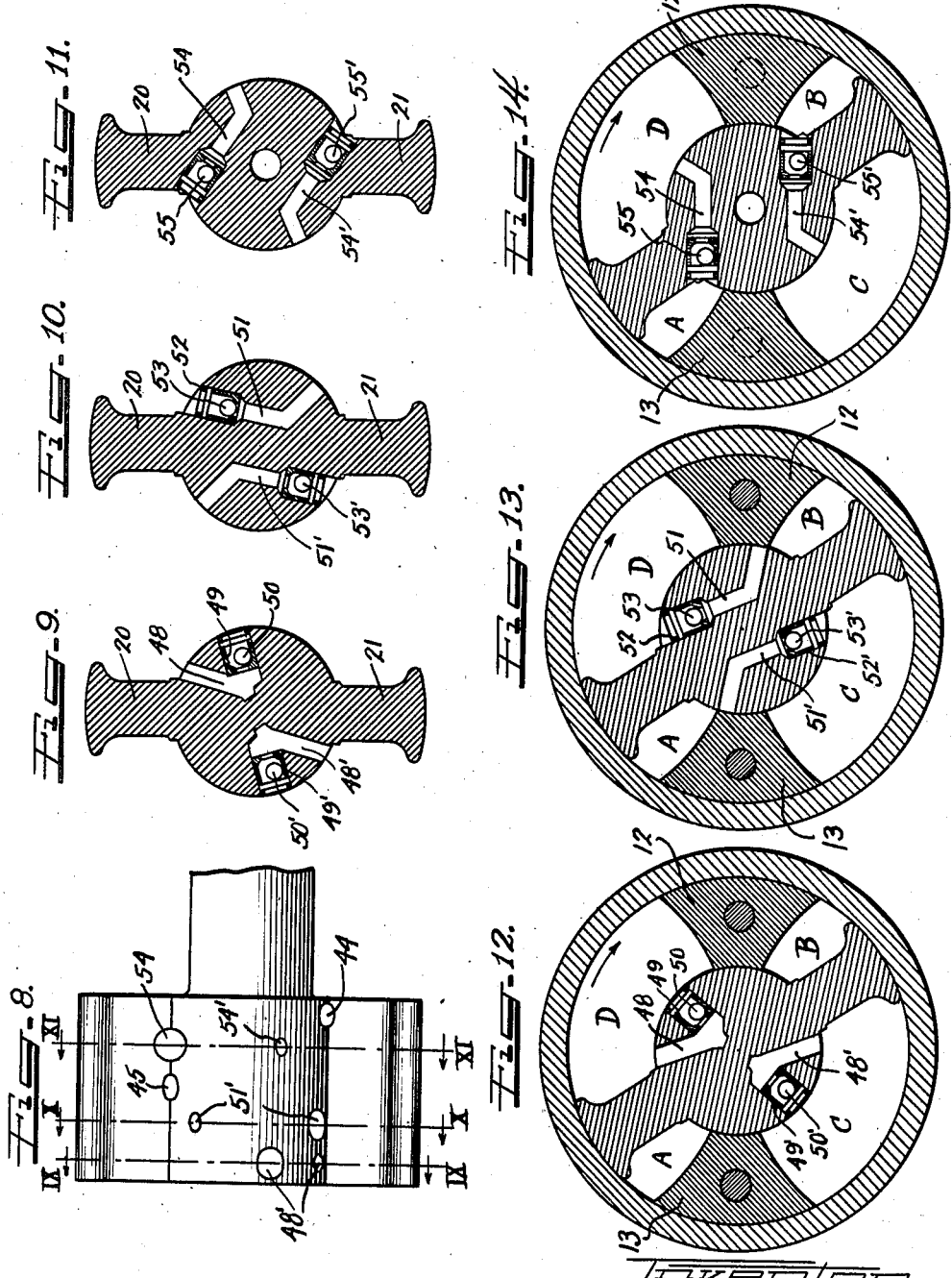

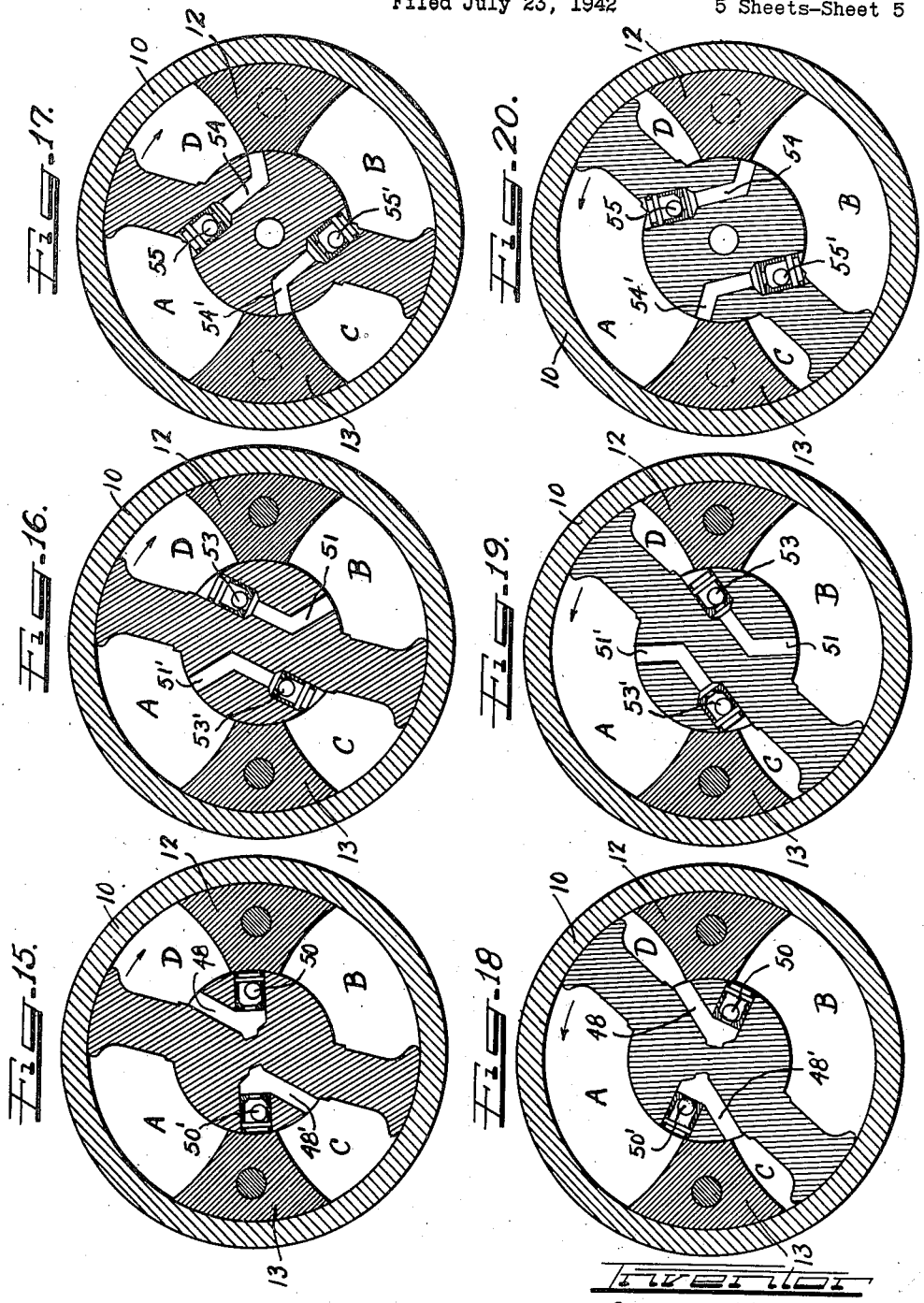

Patented Sept. 21, 1943

2,329,923

UNITED STATES PATENT OFFICE 2,329,923

HYDRAULIC SHOCK ABSORBER

Gervase M. Magrum, Buffalo, N. Y., assignor to Houdaille-Hershey Corporation, Detroit, Mich., a corporation of Michigan Application July 23, 1942, Serial No. 451,995

8 Claims. (Cl. 188—89)

My invention relates to hydraulic control devices for hydraulically regulating the rapidity of movement of structures, through operation cycles thereof. In the hydraulic control of the movements of certain structures it may be desirable to retard the movement by hydraulic resistance during a certain portion or portions of the operation cycle and to lessen or eliminate hydraulic resistance during other portions of the operation cycle, and the general object of my invention is to produce an efficient hydraulic structure for such control.

Hydraulic shock absorbers have been extensively used on automotive and other types of vehicles for hydraulically controlling the movement of the axles or wheels relative to the vehicle body. In such shock absorbers a main valve assembly is usually provided for determining the resistance to flow of hydraulic fluid displaced upon movement of a piston in a cylinder. In the so-called rotary type of shock absorbers, the main valve assembly is usually housed within the oscillating piston structure for control of the flow of the displaced fluid.

My invention relates particularly to the rotary type of hydraulic shock absorber or dampener and the provision therein for additional flow at predetermined periods under resistance less than that through the main passageway controlled by the main valve assembly. More in detail, the important object of my invention is to adapt such rotary hydraulic shock absorber structure for more extended movement control, without changing the shock absorber construction, but by providing additional flow passageways through the piston structure to be controlled by check valves and the shock absorber vane abutments for flow against less resistance, or substantially free flow, during predetermined periods in the cycle of operation of the piston and the structure to be controlled connected with the piston.

Practical and efficient embodiments of my invention are disclosed on the accompanying drawings, in which Figure 1 is a vertical section of a hydraulic shock absorber on line I—I of Figure 2;

Figure 6 is a vertical section of another shock absorber, on plane VI—VI of Figure 7;

Figure 7 is a section on plane VII—VII of Figure 6;

Figure 8 is a side elevation of the piston structure showing the various auxiliary passageways therethrough;

Figure 9 is a section on plane IX—IX Figure 8;

Figure 10 is a section on plane X—X Figure 8;

Figure 11 is a section on plane XI—XI Figure 8;

Figures 12, 13, and 14 are sections like Figure 7 showing respectively the different levels of auxiliary passageways through the piston structure;

Figures 15, 16, and 17 are sections similar to Figures 12, 13, and 14 respectively, showing the piston structure moved to intermediate position;

Figures 18, 19, and 20 are sections similar to Figures 12, 13, and 14 showing the piston structure at one of its extreme positions; and Figure 21 is an indicator card or diagram corresponding with the functioning of the auxiliary passageways for a complete cycle of operations of the piston structure.

Figure 2:
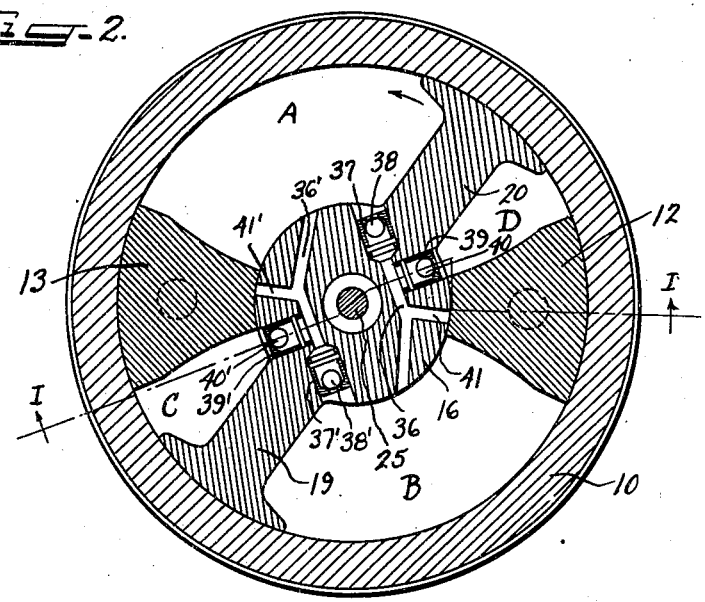
Figure 2 is a section on line II—II of Figure 1, showing the piston near one end of its stroke.
Figure 1:
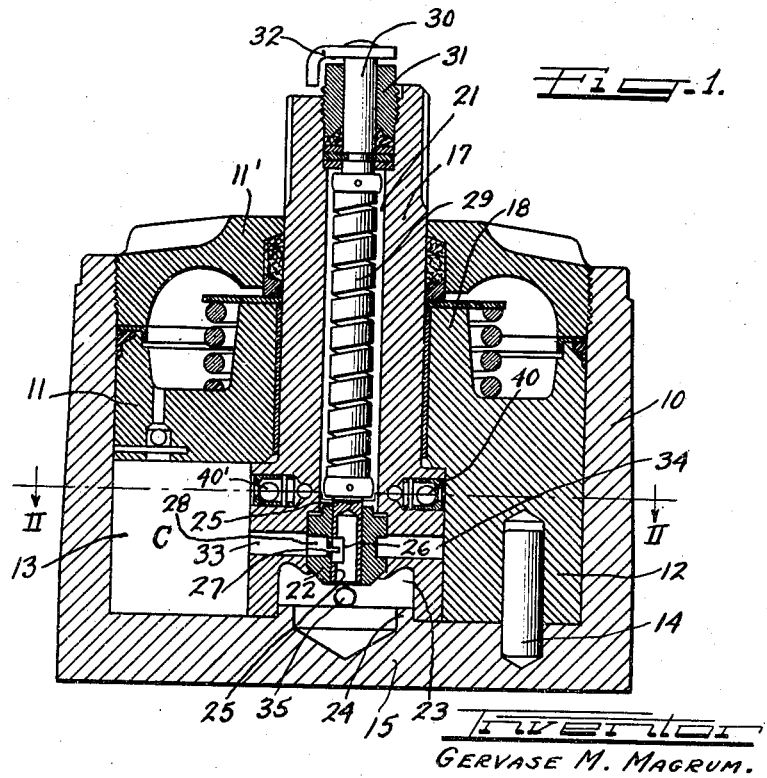

Briefly describing the shock absorber structure of Figures 1 and 2, it comprises the cup-shaped housing 10 receiving the end wall 11 from which extend diametrically opposite abutments 12 and 13 which receive dowel pin 14 extending into the base 15 of the housing 10, the housing 10 and the end wall 11 defining a cylinder space in which the piston structure operates, the wall 11 being held in place by a clamping wall 11' threading into the housing.

The piston structure comprises the cylindrical hub 16 within the cylinder space and having bearing with the inner faces of the abutments 12 and 13. The piston shaft 17 extends through and is journalled in the bearing flange 18 on the end wall 11 and the clamping wall 11' and at its outer end is adapted for connection with a moving structure to be controlled, the housing 10 being adapted in any suitable manner for mounting on a stationery structure adjacent to the movable structure which is to be controlled.

Extending diametrically opposite from the piston hub are the vanes 19 and 20. The piston hub and vanes and the abutments 12 and 13 divide the cylinder space into the diametrically opposite working chambers A and B, and the diametrically opposite working chambers C and D.

The piston shaft has the bore 21 extending therethrough which at its inner end, within the piston hub, is expanded to receive a valve seat plug 22, the hub at its lower end having a cylindrical space 23 which receives the annular base 24 on the base 15 which provides bearing for the inner end of the piston structure. The thermostatically controlled valve may be of the type shown, for example, in Peo Patent 2,063,619, December 8, 1936. The hollow valve 25 which journals in the slot plug 22 has the slot 26 in one side for cooperation with the orifice slit 27 extending through the slot plug from the bottom of the annular channel 28 in the plug. Upon rotation of the valve the exposed length of the orifice slot will be determined for the desired resistance to flow of displaced hydraulic fluid. The thermostat 29 is connected at its lower end to the valve and at its upper end is secured to a bar 30 extending through the closure plug 31 from the outer end of the shaft bore 21, the bar having a handle 32 by which the valve structure may be manually rotated for dimensioning of the orifice 27, the thermostat, when the shock absorber is in service, thermostatically setting the valve plug for orifice adjustment in accordance with change in viscosity of the hydraulic fluid in the shock absorber.

The valve seat plug channel 28 is in communication with the working chambers C and D through the passages 33 and 34 in the piston hub, while the working chambers A and B are in communication with the space 23 in the piston hub through radial passageways 35 in the piston hub, the valve being interposed between the passageways 33, 34, and the passageways 35, the flow of displaced fluid between the chambers A, B, and C, D being controlled by the flow resistance determined by the orifice slit 27.

Figure 3:
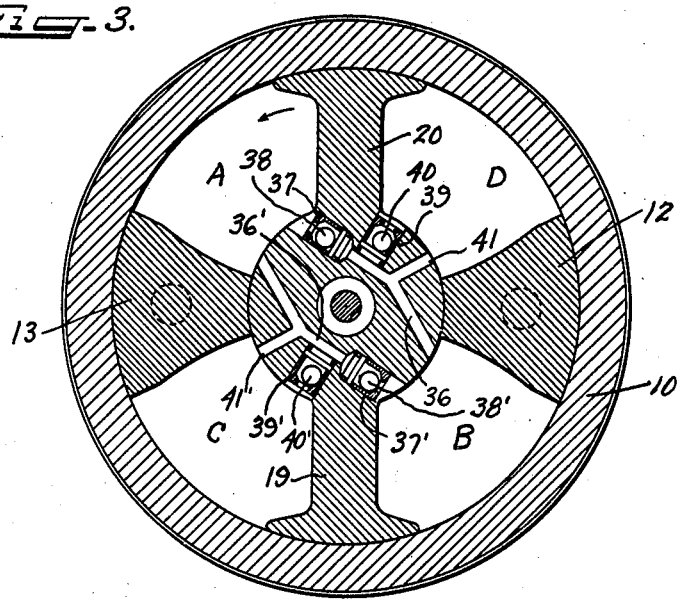
Figure 3 is a section like Figure 2 showing the piston structure at an intermediate point of its stroke.
Figure 4:
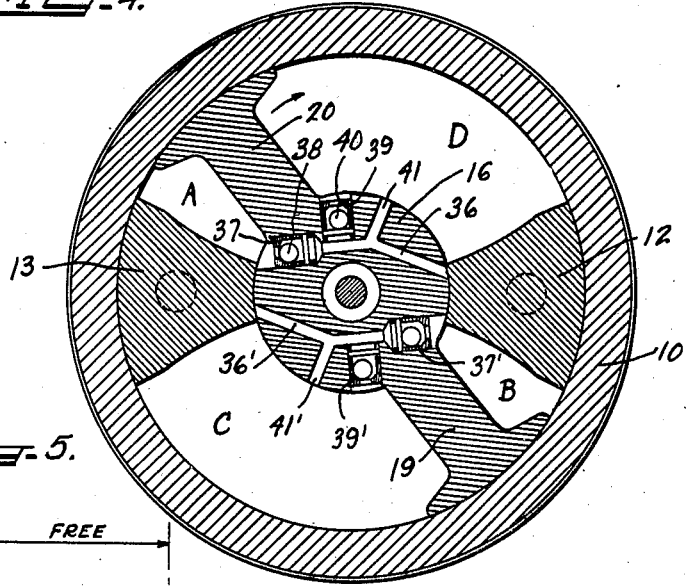
Figure 4 is a section like Figure 2 showing the piston structure near the opposite end of its stroke.

Unless other flow passageways, besides the passageways controlled by the resistance orifice 27, are provided, the hydraulic resistance to oscillation of the piston structure will be retained throughout the cycle of operation of the piston structure. However, in the movement control of certain structures, it is desirable to provide for different speeds at various portions of the movement cycle, and for this purpose I have provided additional flow passageways for the displaced hydraulic fluid which are controlled to function during predetermined periods to afford freer flow, and during other periods are closed against flow so that the movement of the piston structure will then be under the resistance control of the orifice 27. Referring to Figures 1–4, the additional passageways are all on a common level or in a common zone in the piston hub above the flow passageways in the hub controlled by the valve 25. Referring to Figures 2, 3, and 4, one of these passageways 36 extends through the piston hub from adjacent to the base of the vane 20 at the left side thereof to a point at the hub surface between the vanes 20 and 19 at the right side thereof. The end of the passageway 36 adjacent to the base of the vane 20 is expanded to receive the valve cage 37 for a ball valve 38 adapted to seat against the outer end of the cage to close that end of the passageway 36. At the base of the vane 20 at the right side thereof the valve cage 39 is seated in the piston hub for communication at its inner end with the passageway 36 and providing at its outer end a seat for the ball valve 40. Between this valve cage and the open end of the passageway 36 is the branch passageway 41 extending to the outer surface of the piston hub, the ends of these passageways being cooperable with the abutment 12 to be closed thereby during certain positions of the piston structure relative to the abutment.

Extending through the opposite side of the piston hub is a passageway and valving assembly similar to the assembly just described. The cage 37' at the end of the passageway 36' and containing the ball valve 38' is located at the base of the vane 19 at the right side thereof, the passageway 36' terminating in the surface of the piston hub to the left of the vane 20. The cage 39' for the ball valve 40' is at the base of the vane 19 at the left thereof and the branch passageway 41' extends from the passageway 36', the ends of these passageways being cooperable with the abutment 13 to be closed thereby during certain positions of the piston.

Figure 5:
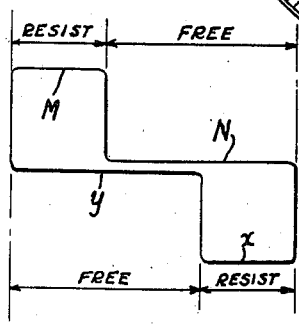
Figure 5 is a diagram or indicator card of the operation of the piston structure illustrated on Figures 2, 3, and 4.

Referring to Figure 2, the piston structure is just starting its rotation in counter-clockwise direction so that the hydraulic fluid in the chambers A and B is put under pressure and tends to escape. This pressure will hold the ball valve 40 and 40' seated against flow into the chambers C and D, the branch passageways 41 and 41' being closed at their ends by the abutments 12 and 13. These auxiliary passageways are thus all closed to the flow of hydraulic fluid from the chambers A and B to the chambers C and D, and the only available passage for the displaced fluid will be through the main path controlled by the resistance orifice 27, and the movement of the piston and the structure to be controlled thereby is thus retarded, and this retardation for dampening continues until the piston structure reaches a position in which there may be flow through the auxiliary passageways. Such auxiliary flow condition is shown on Figure 3 where the piston structure has reached an intermediate point in its travel in counter-clockwise direction and the branch passageways 41 and 41' have been moved away from the abutments 12 and 13. The ball valve 38 and 38' will be unseated and the fluid will flow into the ends of the passageway 36 and 36' and through the branch passageways 41 and 41' into the working chambers C and D, and this comparatively free flow will continue during the remainder of the travel of the piston in counter-clockwise direction. As the piston travels from the position shown on Figure 3 to the position shown on Figure 4, the ends of the passageways 36 and 36' will be closed by the abutments but the branch passageways 41 and 41' will remain open to the chambers C and D and the pressure of the chambers A and B will unseat the ball valve 38 and 38' for flow of the fluid from these chambers to the passageways 41 and 41' to the chambers C and D. On the indicator card or diagram shown on Figure 5, the resistance travel of the piston in counter-clockwise direction under control of the orifice 27 is indicated by the line X, and the comparatively free movement of the piston in counter-clockwise direction is indicated by the line Y.

During clockwise movement of the piston from the position shown in Figure 4, the comparatively free flow passageways will be closed, the ends of the passageways 36 and 36' being closed by the abutments 12 and 13 and the valve 38 and 38' at the other ends of these passageways will be seated by the pressure of the fluid flowing from the chambers C and D through the passages 41 and 41' into the passageways 36 and 36', and the only available path for the fluid displaced from the chambers C and D to the chambers A and B will be through the resistance path including the resistance orifice 27 controlled by the valve 25. This hydraulic resistance movement of the piston in clockwise direction will continue until the passageways 36 and 36' leave the abutments 12 and 13, as shown on Figure 3, the fluid then flowing from the chambers C and D through the passageways 41 and 41' into the passageways 36 and 36' and out of the free ends of these passageways into the chambers A and B. As the piston continues the travel towards the end of its clockwise rotation, the passageways 41 and 41' will come into engagement with the abutments 12 and 13, respectively, but then the pressure in the chambers C and D will unseat the valves 40 and 40' for continued flow from these chambers through the passageways 36 and 36' into the chambers A and B. On the diagram shown on Figure 5, M indicates the resistance period of travel of the piston in clockwise direction and N indicates the free movement thereof. By changing the locations of the ends of the auxiliary passageways in the piston hub relative to the abutments, the lengths of the resistance and free periods, or the time of occurrence of such periods in the cycle of operation of the piston may be as desired.

Figures 7-21 show a modified arrangement for auxiliary flow passageways, three such passageways being provided located at different levels or zones in the piston hub. Figures 6 and 7 show the shock absorber to which this modified arrangement is applied. The shock absorber shown is substantially the same as the shock absorber in Figures 1 and 2 except for a different valve structure. The valve structure shown comprises the stem 42 in the piston shaft bore 21 projecting at its lower end into the axial passageway 43 in the piston hub between the upper and lower passageways 44 and 45 in the piston hub which connect respectively the working chambers A and B, and the chambers C and D. The valve at its lower end has the metering slot 46 which is opened to a predetermined degree to the passageway 44, the degree of exposure of the slot being determined by adjustment of the valve stem which has threaded engagement with the piston shaft bore as indicated at 47.

Referring to Figures 8 to 11, the piston hub has three sets of auxiliary passageways therethrough at different levels. Figure 9 shows the lower level passageways 48 and 48' at opposite sides of the piston hub. One end of the passageway 48 terminates at the cylindrical face of the piston hub at the base of the vane 20 at the right thereof and the other end of the passageway 48 terminates approximately midway between the vanes 20 and 21 and has a cage 49 therein for the ball valve 50. The passageway 48' has its one end terminating at the base of the vane 21 at the left thereof and has its other end as the cage 49' for the ball valve 50'.

Figure 10 shows the passageways 51 and 51' located in the piston hub at an intermediate level, one end of the passageway 51 terminating at the base of the vane 21 at the right thereof, and the other end terminating at the base of the vane 20 at the right thereof and having therein a cage 52 for a ball valve 53. The passageway 51' has the ball valve 53' in its end which terminates adjacent to the base of the vane 21 at the left thereof, the other end of the passageway terminating at the left of the vane 20 near the base thereof.

The third set of passageways 54, 54' are located in the piston hub at the upper level, the passageway 54 having the ball valve 55 in its end which terminates at the base of the vane 20 at the left thereof, the other end of the passageway terminating at the right of and a distance away from the vane 20. The passageway 54' has the ball valve 55' in its end which terminates at the base of the vane 21 at the right thereof, the other end of the passageway terminating at the left of and a distance from the vane 21.

Figures 12, 13, and 14 show the piston structure starting its travel in clockwise direction. Both ends of the passageway 48 and 48' are in communication with the working chambers D and C respectively, while the ends of the passageways 51 and 51' are in engagement respectively with the abutments 12 and 13 to be closed thereby. The passageway 54 has its valved end exposed to the working chamber A and its other end to the chamber D, while the passageway 54' has its valved end open to the chamber B and its other end to the chamber C. As the piston moves in clockwise direction the fluid in the chambers C and D is subjected to pressure, and the valve 55 and 55' in the passageways 54 and 54' will be unseated for flow of fluid from the chambers C and D to the chambers A and B and this comparatively free flow will continue until the ends of these passageways come into engagement with the abutments 12 and 13 as shown on Figure 17. The passageways 51 and 51' were kept closed by their engagement with the abutment as shown on Figure 13, and after the abutments have been passed, the pressure in the chambers C and D will hold the valve 53 and 53' seated for continued closure of the passageways, as shown on Figure 16. During travel of the piston from its position in Figures 12, 13, and 14 to its position in Figures 15, 16, and 17, the passageways 48 and 48' took no part but remained neutral, the valved ends of the passageways coming into engagement with the abutments 12 and 13 as shown on Figure 15.

During travel of the piston from its position in Figures 12, 13, and 14 to that of Figures 15, 16, and 17, the passageways 54 and 54' afford comparatively free flow between the working chambers and this part of the shock absorber operation is indicated by the line O on the diagram shown on Figure 21. After the piston reaches the position shown on Figures 15, 16, and 17, the free flow of the fluid will be stopped by the closure of the passageways 54 and 54' by the abutments 12 and 13, the ball valves for the passageways 51 and 51' being kept closed by the pressure in chambers C and D, and flow through the passageways 48 and 48' is also prevented by the abutments 12 and 13, so that during this period the only path for flow of the fluid from the chambers C and D to the chambers A and B will be through the piston hub passageways 44 and 45 controlled by the metering orifice determined by the slot 46 in the valve stem, and this period of operation of the shock absorber is indicated by the line P on the diagram Figure 21.

As the piston continues its travel in clockwise direction toward the end of such movement, the passageways 54 and 54' will leave the abutments 12 and 13 and will then merely connect together the chambers A and B. The passageways 51 and 51' remain closed by their ball valves which are still subjected to the pressure in the chambers C and D. However, the valved ends of the passageways 48 and 48' will move away from the abutments 12 and 13 during the final movement of the piston in clockwise direction and these passageways will then connect the chambers C and D with the chambers A and B, as shown on Figure 18, and we again have free flow, as indicated by the line Q on the diagram Figure 21. Thus, clockwise rotation of the piston, was first comparatively free, then against resistance of the metering orifice, and then again free.

When the piston starts its counter-clockwise movement from the position shown in Figures 18, 19, and 20, the fluid in chambers A and B will be put under pressure which will seat the ball valve 50 and 50' so that there can be no flow through the passageways 48 and 48' to the chambers C and D, as shown on Figure 18. The passageways 54 and 54' (Figure 20) connect the chambers A and B and after a short movement in counter-clockwise direction of the piston these passageways will be closed by the abutments 12 and 13 so that there can be no flow from the chambers A and B to the chambers C and D. However, the pressure will unseat the ball valve 53 and 53' for fluid flow from the chambers A and B through the passageways 51 and 51' to the chambers C and D (Figure 19), and the flow through these passageways will continue until the ends of the passageways come into engagement with the abutments 12 and 13 (Figure 13), and the passageways then remain closed by the abutments to the end of the counter-clockwise movement of the piston.

As the piston moves in its counter-clockwise direction from the position shown on Figure 18, the valved ends of the passageways 48 and 48' will come into engagement with the abutments 12 and 13, as shown in Figure 15, and when the piston approaches the end of its counter-clockwise movement (Figure 12) both ends of the passageways 48 and 48' will be exposed to the chambers C and D so that there can be no flow therethrough from the chambers A and B to the chambers C and D.

After counter-clockwise rotation of the piston from the position shown in Figure 17, the passageways 54 and 54' will be moved away from the abutments 12 and 13 but then the pressure in the chambers A and B will seat the ball valve 55 and 55' to close these passageways. All the various auxiliary passageways being now closed, all the flow during final movement of the piston in counter-clockwise direction will be through the passageways 44 and 45 controlled by the metering orifice 46. On the diagram Figure 21 the line R represents the free flow afforded by the auxiliary passageways during the fore part of the counter-clockwise movement of the piston, and the line S indicates the resistance flow during the last part of the piston counter-clockwise travel. By changing the locations of the ends of the auxiliary passageways the duration of the resistance periods and free periods may be correspondingly changed, or the location of these resistance or free periods in the cycle of piston operation may be made as desired, and thus the hydraulic checking or shock absorbing device may be adapted for the desired movement control of the structure with which the hydraulic device is associated.

The various auxiliary passageways may be dimensioned for comparatively free flow, or may be restricted, or provided with flow resisting means which will resist flow therethrough to a lesser degree than the resistance to flow afforded by the metering orifice 46 controlled by the valve 42, so that the movement of the structure to be controlled may be against high hydraulic resistance, or lesser hydraulic resistance, or comparatively free at predetermined periods during either direction of travel of the piston.

I have shown a practical and efficient embodiment of my invention but I do not desire to be limited to the exact structure arrangement and operation as described as changes and modifications may be made without departing from the spirit of the invention.

I claim as follows:

1. A hydraulic dampening structure comprising a cylinder element and a piston element, said cylinder element having abutments extending radially therein to divide the cylinder space into working chambers, said piston comprising a cylindrical hub having bearing engagement with the inner faces of said abutments and having vanes extending into said working chambers for displacement of fluid therein, main passageways in said piston hub for flow of hydraulic fluid between said working chambers, flow resistance means in said main passageways for resisting the flow between working chambers, auxiliary passageways through the piston hub for freer flow of fluid between the working chambers, and check valves controlling said auxiliary passageways, the ends of said passageways being cooperable with said abutments to be closed thereby during certain periods in the movement of said piston whereby when all of said auxiliary passageways are closed by said check valves or said abutments, the entire flow between working chambers must be through the restricted main passageways, and whereby during other portions of travel of the piston said auxiliary passageways will be opened to afford freer flow between the working chambers.

2. A hydraulic control device comprising a cylinder and a piston element, said cylinder having diametrally opposite inwardly extending abutments dividing the cylinder into hydraulic working chambers, said piston element comprising a cylindrical hub having bearing against the inner faces of said abutments and having vanes extending into said working chambers, a main passageway for the flow of fluid displaced by the piston and means within said passageway for resisting said flow, auxiliary passageways through the piston hub terminating at their ends in the cylindrical surface of said hub, said auxiliary passageways having check valves at one end thereof and the other ends thereof being closed by said abutments at certain periods in the travel of the piston, said check valves and said abutments cooperating to expose said passageways for comparatively low resistance flow between said working chambers during certain periods in the movement of the piston and to close said passageways against flow during other periods of movement whereby during such other periods of movement the flow between working chambers will be restricted to said resistance passageway.

3. A hydraulic device comprising a cylinder having opposed radial abutments therein dividing the cylinder into hydraulic working chambers, a piston structure comprising a cylindrical hub concentric with the cylinder and having bearing engagement between its cylindrical surface and the inner faces of said abutments and having vanes extending therefrom into said working chambers, main passageways through said piston hub for flow of displaced hydraulic fluid between said working chambers and means interposed in said main passageways for resisting the flow therethrough, auxiliary passageways through said piston hub terminating at their ends in the cylindrical face of said hub at predetermined points relative to said vanes, and check valves in said passageways subjected to the pressure of displaced fluid, said abutments in cooperation with said check valves functioning during relative movement of the cylinder and piston structure to open certain auxiliary passageways at predetermined times for reduced resistance flow between said working chambers and at other predetermined times to close said auxiliary passageways to cause all of the displaced fluid to flow through said main resistance passageways.

4. A hydraulic device for the purpose described comprising a cylinder having opposed radially extending abutments therein for dividing the cylinder space into working chambers, a piston structure comprising a cylindrical hub having bearing engagement between its cylindrical surface and the inner faces of said abutments and having vanes extending therefrom into said working chambers for displacement of fluid upon relative rotation of the cylinder and piston structure, a main passageway through said piston hub for the displaced fluid flow and means interposed in said main passageway for resisting the flow therethrough, auxiliary passageways through the piston hub terminating at their ends in the cylindrical surface of the hub at predetermined points relative to said vanes, check valves in said auxiliary passageways at one end thereof, the other ends of said passageways being carried by a said piston structure past said abutments to be closed thereby, said abutments in cooperation with said check valves functioning during relative rotation of the cylinder and piston structure to open certain of said auxiliary passageways at predetermined times for reduced resistance flow between said working chambers and at other times to close all of said passageways to restrict the displaced fluid flow to said main resistance passageways.

5. A hydraulic control device comprising a cylinder having diametrically opposite inwardly extending abutments dividing the cylinder into hydraulic working chambers, a piston comprising a cylindrical hub having bearing against the inner faces of said abutments and having vanes extending into said working chambers, a main passageway through the piston hub for flow at all times of hydraulic fluid between the working chambers but having means interposed therein for resisting such flow, a number of auxiliary passageways in said piston hub terminating at their ends in the cylindrical face of the hub, one end of each auxiliary passageway having a check valve therein and its other end being cooperable with one of said abutments for closure thereby during a predetermined period in the operation of the piston, said check valves being responsive to fluid pressure to close corresponding auxiliary passageways during periods when said passageways are kept closed by said abutments.

6. A hydraulic control device comprising a cylinder having a pair of diametrically opposite inwardly extending abutments dividing the cylinder into hydraulic working chambers, a piston comprising a cylindrical hub having bearing against the inner faces of said abutments and having vanes extending into said working chambers, a main passageway through said piston hub for flow at all times of hydraulic fluid between the working chambers but having means interposed therein for resisting flow therethrough, a pair of auxiliary freer flow passageways through said piston hub at opposite sides of its axis, each of said auxiliary passageways having a check valve in one end and its other end movable with said piston hub past one of said abutments to be closed thereby during a certain period of the operation of said piston, the check valve in each of said auxiliary passageways being controlled by the fluid pressure to close said passageway when the other end thereof is away from the respective abutment.

7. A hydraulic shock absorber comprising a cylinder having inwardly extending abutments dividing the cylinders into hydraulic working chambers, a piston comprising a cylindrical hub having bearing against the inner faces of said abutments and having vanes extending into said working chambers, a plurality of passageways extending transversely through said piston hub and terminating at the outer face thereof, one of said passageways being at all times open for flow but being provided with means for resisting the flow therethrough, said other passageways being open for freer flow during certain periods in the operation of said piston but being all closed by the inner ends of said abutments during other periods in the operation of the piston, and check valves in said other passageways controlled by the fluid pressure to close said passageways during certain periods when said passageways are free of said abutments.

8. A hydraulic control device comprising a cylinder having abutments extending radially therein to divide the cylinder into working chambers, a piston comprising a cylindrical hub having bearing against the inner faces of said abutments and having vanes extending into said working chambers, a plurality of flow passageways extending transversely through said piston hub at different levels therein and terminating at their ends in the cylindrical face of the hub, one of said passageways being always open for flow of the fluid between said working chambers but having means therein for resisting such flow, each of said other passageways having one end thereof movable past one of said abutments for closure thereby and having a check valve in its other end, said check valves and abutments cooperating to selectively close all of said other passageways during predetermined periods of operation of the piston and to permit flow through one or more of said other passageways during other periods of operation of the piston.

GERVASE M. MAGRUM.